UNITED STATES PATENT OFFICE.

PHILIPP EYER, OF HALBERSTADT, GERMANY, ASSIGNOR TO THE FIRM OF RUDOLPH KOEPP & CO., OF OESTRICH-ON-THE-RHINE, GERMANY, A SOCIETY OF GERMANY.

ENAMEL COMPOSITION AND PROCESS OF MANUFACTURING IT.

1,256,456.  Specification of Letters Patent.  Patented Feb. 12, 1918.

No Drawing.  Application filed February 14, 1917. Serial No. 148,696.

*To all whom it may concern:*

Be it known that I, PHILIPP EYER, a subject of the German Emperor, and resident of Halberstadt, Germany, have invented certain new and useful Improvements in Enamel Compositions and Processes of Manufacturing Them, of which the following is a specification.

In the manufacture of enamels for enameling iron articles such as cooking utensils and the like, boron compounds, more particularly borax and boric acid, play an important part. In many enamel recipes, the cost of boron compounds is higher than that of all the other ingredients together. For that reason it has been frequently attempted to replace pure boron compounds such as borax and boric acid by natural products containing alakli earth metals, such as borocalcite, colemanite, boronatrocalcite, boracite, etc., known under the generic name of natural calcium borates.

These attempts could not however lead to the introduction of natural calcium borate into the enamel industry, as additional constituents and the impurities found in the natural calcium borate, more particularly the high percentage of lime and magnesia, rendered the enamels useless. The surprising discovery however has been made that the drawbacks due to the presence of large quantities of alkali earth metals, could be got rid of by manufacturing the enamels with corresponding quantities of glass, preferably large quantities. On the basis of this discovery it is possible to use, in place of the expensive borax or expensive boric acid, the considerably cheaper natural calcium borate. For carrying out the process various kinds of glass are suitable, more particularly soft glass which, owing to its high percentage of alkali, has a low melting point. Glass can be used for instance which compared with silicic acid and the other base contains considerably higher quantities of alkali than usual. Even water glass can be used which does not contain any other base than alkali. Obviously such glass with a higher percentage of alkali can be manufactured for the purpose. Ordinary commercial glass can also be enriched with alkali by melting it preferably with ample quantities of alkalis or with suitable alkali compounds, such as alkali carbonate, alkali silicate, alkali bisulfate and coal. A glass can be used which also contains other fluxes, for instance boron compounds, lead compounds, boron and lead compounds, or in the same way as with alkali, other fluxes such as borax, boric acid, cryolite, sodium fluosilicate and the like could be introduced into the glass mass. Advantageously a milk or opaline glass which contains, as a flux, fluorin and also ample quantities of alkali may be used.

The quantity of glass used will vary of course with the nature and proportions of the other raw materials. The quantity of glass needed can be ascertained in each case by experiment. Obviously glass is not simply added to the known recipes, but other corresponding ingredients, for instance quartz or feldspar or both, are replaced entirely or partly by glass. Very considerable quantities of glass can be added, in certain cases with special advantage. It has been found for instance that the presence of glass also destroys or reduces the injurious influence of the undesired salts, such as chlorids or sulfates, frequently mixed with natural calcium borate. Nevertheless, in choosing natural calcium borate, it is preferable to use one containing small percentages of chlorid and sulfate.

Experiments have shown that in many cases the injurious action of the alkaline earth introduced in the form of natural calcium borate, can be neutralized by a corresponding introduction of glass. In other cases, for instance in recipes which already contain lime-containing ingredients, the lime-containing substances can be replaced by other lime-free substances having the same action. If for instance it is desired, in a recipe containing feldspar, to replace borax or boric acid by natural calcium borate, the lime-containing feldspar can be replaced by an alkali metal fluorin compound, the percentage of alkaline earth in the natural calcium borate being, for the rest, neutralized by a corresponding addition of glass.

In the manufacture of enamels with the use of natural calcium borate and glass, the presence of fluorin compounds, more particularly of fluorin-alkali metal compounds, for instance of sodium fluosilicate or cryolite, has proved very advantageous. It is therefore advisable, to take care that fluorin compounds should be present. They can be introduced as a separate addition, for instance in the form of cryolite, as well as in some other form, for instance as an ingredient of the glass.

It has been moreover found advantageous, in working in accordance with the present invention, to melt in clay also, as this improves the covering capacity of the enamels. An addition of clay is more particularly advisable when glass is introduced in place of feldspar. In this case it is necessary to melt in at least as much clay as corresponds to the alumina of the feldspar omitted. It is however preferable in many cases to use a still greater addition of clay.

In working according to this invention, borax or boric acid can be replaced by natural calcium borate to such an extent that the total contents of boron in the enamel remain the same. The proportion of boron compounds however can also be reduced, as glass has also the property of acting as a substitute for borax or boric acid. This property of glass becomes more particularly noticeable in the presence of fluorin-alkali metal compounds. In reducing the proportion of boron, it is therefore advisable to take special care that fluorin compounds should be present.

*Examples.*

1. A normal enamel mass for a ground or first coat enamel which contains 24.5 parts quartz, 25.5 parts feldspar, 38 parts borax, 5 parts fluorspar, 40 parts soda, 3 parts saltpeter, 0.3 parts nickel oxid and 0.05 parts cobalt, can be replaced by the following mass:

3 parts ruby glass, 25 parts feldspar, 30 parts natural calcium borate, 4.8 parts sodium fluosilicate, 8 parts soda, 3 parts saltpeter, 0.3 parts nickel oxid, 0.05 parts cobalt oxid.

2. A normal white covering enamel which contains 22 parts quartz, 30 parts feldspar and 24 parts borax, in addition to other "ground" substances such as soda, saltpeter, fluorspar, etc., can be replaced by the following mass:

30 parts pressed glass, 25 parts feldspar, 12 parts clay, 15 parts natural calcium borate, 15 parts sodium fluosilicate, 4 parts soda, 1 part saltpeter.

The manufacture is carried out in the usual way by melting together the ingredients in a melting furnace. In grinding the enamel masses, additions such as clay, metal oxids, etc., can be made in the known manner.

In many cases it has been found advantageous first to melt natural calcium borate with glass, and to introduce the mass obtained so to say as a substitute for borax, in such a manner that the natural calcium borate-glass mass is melted together with the other ingredients required for forming enamel.

In the manufacture of natural calcium borate-glass, it is also possible to melt at the same time other desired substances, such as alkali compounds, fluorin compounds, boron compounds, clay or the like.

The present invention has the great advantage that in place of the expensive pure boron compounds such as boric acid and borax, much cheaper natural products can be used, and in certain cases it is also possible to reduce the percentage of boron itself.

Enamels manufactured according to the invention, have proved excellent for the enameling of iron articles. They are distinguished by great resistance to acids and good adhesion. Enamels obtained by double melting, that is to say by first melting natural calcium borate with glass or with other additions, the mass obtained being melted with the other ingredients of the enamel mass have proved particularly good.

I claim—

1. An enamel composition comprising a natural calcium borate, glass, clay and fluorin compounds.

2. An enamel composition comprising a natural calcium borate, glass, clay, feldspar and sodium fluosilicate.

3. An enamel composition comprising 30 parts glass, 25 parts feldspar, 12 parts clay, 15 parts natural calcium borate, 15 parts sodium fluosilicate, soda and saltpeter.

4. The process for the manufacture of enamels which consists in melting together natural calcium borate and glass, and subsequently melting with the fused mass thus formed the remaining enamel constituents, said constituents including fluosilicate.

5. The process for the manufacture of enamels which consists in melting together natural calcium borate, clay and glass rich in alkali and subsequently melting with the fused mass thus formed sodium fluosilicate, soda and saltpeter.

In testimony whereof I have signed my name to this specification in the presence of two subscribing witnesses.

PHILIPP EYER.

Witnesses:
 RUDOLPH FRICKE,
 R. H. TEAGLE.